United States Patent
Chang (10) Patent No.: US 11,469,672 B2
(45) Date of Patent: Oct. 11, 2022

(54) INTERLEAVED MULTI-LEVEL BUCK-BOOST SWITCHING POWER CONVERTER WITH PULSE-WIDTH MODULATION

(71) Applicant: SILEGO TECHNOLOGY INC., Wilmington, DE (US)

(72) Inventor: Kevin Yi Cheng Chang, Chandler, AZ (US)

(73) Assignee: Silego Technology Inc., Wilmington, DE (US)

( * ) Notice: Subject to any disclaimer, the term of this patent is extended or adjusted under 35 U.S.C. 154(b) by 121 days.

(21) Appl. No.: 16/732,189

(22) Filed: Dec. 31, 2019

(65) Prior Publication Data

US 2021/0203233 A1    Jul. 1, 2021

(51) Int. Cl.
*H02M 3/158* (2006.01)
*H02M 3/07* (2006.01)

(52) U.S. Cl.
CPC ......... *H02M 3/1584* (2013.01); *H02M 3/077* (2021.05); *H02M 3/1586* (2021.05)

(58) Field of Classification Search
CPC .. H02M 3/07; H02M 3/073; H02M 2003/076; H02M 2003/1586
See application file for complete search history.

(56) References Cited

U.S. PATENT DOCUMENTS

| | | | | |
|---|---|---|---|---|
| 5,959,441 | A * | 9/1999 | Brown | H02M 3/1584 323/282 |
| 6,348,781 | B1 * | 2/2002 | Midya | H03F 1/0227 323/222 |
| 7,746,041 | B2 * | 6/2010 | Xu | H02M 3/157 323/223 |
| 8,519,777 | B2 * | 8/2013 | Brown | H03F 3/005 327/536 |
| 9,559,589 | B2 * | 1/2017 | Petersen | H02M 3/07 |
| 9,973,089 | B1 * | 5/2018 | Terasawa | H02M 1/42 |
| 10,003,261 | B2 | 6/2018 | Petersen et al. | |
| 10,727,747 | B2 * | 7/2020 | Macri | H02M 3/1582 |
| 2014/0070787 | A1 * | 3/2014 | Arno | H02M 3/07 323/304 |
| 2017/0099011 | A1 * | 4/2017 | Freeman | H02M 7/06 |
| 2017/0163157 | A1 | 6/2017 | Petersen | |
| 2019/0294187 | A1 * | 9/2019 | Ying | G05F 1/10 |
| 2020/0144934 | A1 * | 5/2020 | Chen | H02J 3/381 |
| 2020/0389132 | A1 * | 12/2020 | Khlat | H03F 3/45475 |
| 2020/0395852 | A1 * | 12/2020 | Yoo | H02M 1/14 |
| 2021/0203223 | A1 * | 7/2021 | Chang | H02M 3/1586 |

OTHER PUBLICATIONS

Soltani et al., "Family of step-up DC/DC converters with fast dynamic response for low power applications", IET Power Electron, 2016, vol. 9, Issue 14, pp. 2665-2673.

(Continued)

*Primary Examiner* — Gustavo A Rosario-Benitez
(74) *Attorney, Agent, or Firm* — Haynes and Boone, LLP (57) ABSTRACT

Disclosed is an interleaved buck-boost converter. The interleaved buck-boost converter includes a master switching stage and a slave switching stage that are controlled by a pulse-width-modulation (PWM) controller.

15 Claims, 6 Drawing Sheets

(56) References Cited

OTHER PUBLICATIONS

Zhang, et al., "Multilevel Non-Inverting Buck-Boost Converter With Low-Frequency Rippleshaping Based Controller for Operating in Step-Down/Step-Up Transition Region," IEEE 19th Workshop on Control and Modelling for Power Electronics (COMPEL), Jun. 2018.

P'erez-Nicoli, et al., "A Series-Parallel Switched Capacitor Step-Up DC-DC Converter and its Gate-Control Circuits for Over the Supply Rail Switches," IEEE 5th Latin American Symposium on Circuits and Systems (LASCAS), Feb. 2014.

Forouzesh, et al., "A Survey on Voltage Boosting Techniques for Step-Up DC-DC Converters", 2016 IEEE Energy Conversion Congress and Exposition (ECCE), Sep. 2016.

Cassidy, Brian Michael, "A Constant ON-Time 3-Level Buck Converter for Low Power Applications", Blacksburg, Virginia, Jan. 30, 2015.

Sahu, et al., "An Accurate, Low-Voltage, CMOS Switching Power Supply with Adaptive On-Time Pulse-Frequency Modulation (PFM) Control", Circuits and Systems I: Regular Papers, IEEE, vol. 54, Mar. 2007.

Villar et al., "Monolithic Integration of a 3-Level DCM-Operated Low-Floating-Capacitor Buck Converter for DC-DC Step-Down Conversion in Standard CMOS", IEEE Annual Power Electronics Specialists Conference, Jul. 2008.

\* cited by examiner

INTERLEAVED MULTI-LEVEL BUCK-BOOST SWITCHING POWER CONVERTER WITH PULSE-WIDTH MODULATION

TECHNICAL FIELD

This application relates to multi-level power converters, and more particularly to multi-level power converters with regulated output voltages.

BACKGROUND

A typical computing power supply for laptops and related devices such as tablets uses a combination of Lithium Ion (Li-Ion) batteries, usually arranged in groups of two cells in series that produces a maximum voltage of approximately 10 Volts (V). Such a relatively high-power supply voltage is unsuitable for modem integrated circuits so mobile personal computers (PCs) conventionally include a buck converter to regulate the battery power supply voltage from the series-connected batteries to an internal power supply voltage such as 1 V for powering the integrated circuits within the device.

A single stage multi-phase buck converter would require high voltage components to step down from such a relatively high battery power supply voltage to the relatively low internal power supply voltage. The use of such high voltage components demands substantial die space to achieve suitable drain to source resistance and also leads to higher gate drive losses and voltage-current overlap switching losses for the power switches. Thus, single stage multi-phase buck converters are not very efficient in applications in which the output voltage is substantially stepped down from, for example, around 10V to 1V.

To improve the efficiency, multi-level buck converters having multi-stages have been used. A first stage comprises a step-down switched capacitor (charge pump) stage that converts the input voltage from the batteries into an intermediate charge pump output voltage. A second stage converts the intermediate charge pump output voltage into the regulated internal power supply voltage. But the efficiency of such multi-stage power converters at a low output load and/or higher boost outputs is a problem.

In addition, additional switches are needed in multi-level buck converters that cause control problems from the increased regulation complexity for the multi-level buck converters that have a nonlinear conversion function. Moreover, at high duty-cycles, proper loop compensations for these types of converters is also a problem. Furthermore, many known multi-level buck converters need to be individually configured with different functional modes of operation to cover the specified input and output voltages due to the lack of an effective mechanism to detect and regulate the multi-level buck converter in wide voltage-ranges during system operations.

SUMMARY

An interleaved buck-boost converter is provided that includes: an input voltage terminal configured to provide an input voltage; an output filter including an inductor having an input terminal and an output capacitor for an output voltage; an error amplifier configured to drive an error signal responsive to a difference between the output voltage and a reference voltage; a master switching stage including a first flying capacitor; a slave switching stage including a second flying capacitor; and a pulse-width modulation (PWM) controller configured to configure the master switching stage into a master magnetizing switching state in which the input terminal is charged to a first multiple of the input voltage during a master magnetizing period extending from a reset of a first ramp signal until a second ramp signal exceeds the error signal, and wherein the PWM controller is further configured to configure the slave switching stage into a slave magnetizing switching state in which the input terminal is charged to the first multiple of the input voltage during a slave magnetizing period extending from a reset of the second ramp signal until the first ramp signal exceeds the error signal.

A method of operating an interleaved buck-boost converter is also provided that includes: generating an error signal responsive to a difference between an output voltage for an output filter and a reference voltage; generating a first ramp signal responsive to a first edge of a clock signal; generating a second ramp signal responsive to a second edge of the clock signal; in a master switching stage including a first flying capacitor, charging an input terminal for the output filter to twice an input voltage over a master magnetizing period that begins responsive to the first edge of a clock signal and ends responsive to the second ramp signal exceeding the error signal; and in a slave switching stage including a second flying capacitor, charging the input terminal to the input voltage during a first sub-level cycle extending from a termination of the master magnetizing period to a subsequent first edge of the clock signal.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

An interleaved buck-boost converter is disclosed that includes at least a master switching stage and a slave switching stage. A pulse-width modulation (PWM) controller controls the switching states for the master and slave switching stages so that the master and slave switching stages alternate between respective magnetizing stages. When either stage is in a magnetizing state, its flying capacitor discharges to an inductor in an output filter for the interleaved buck-boost converter. The remaining stage's flying capacitor charges while the other stage is in the magnetizing state. In a cascaded configuration, a linking switch between the master and slave stages closes while the slave is in the magnetizing state so that the master stage's flying capacitor is charged by the slave switching stage. The timing of the switching states is responsive to a comparison of an error signal to a first ramp signal and a second ramp signal. The first ramp signal resets responsive to a first edge (e.g., a falling edge) of a master clock signal. Similarly, the second ramp signal resets responsive to a second edge (e.g., a rising edge) of the master clock signal. The second ramp signal is thus delayed by one-half of a period (TB) for the master clock signal with respect to the first ramp signal. An error amplifier produces the error signal responsive to a difference between an output voltage and a reference voltage.

Figure 1:
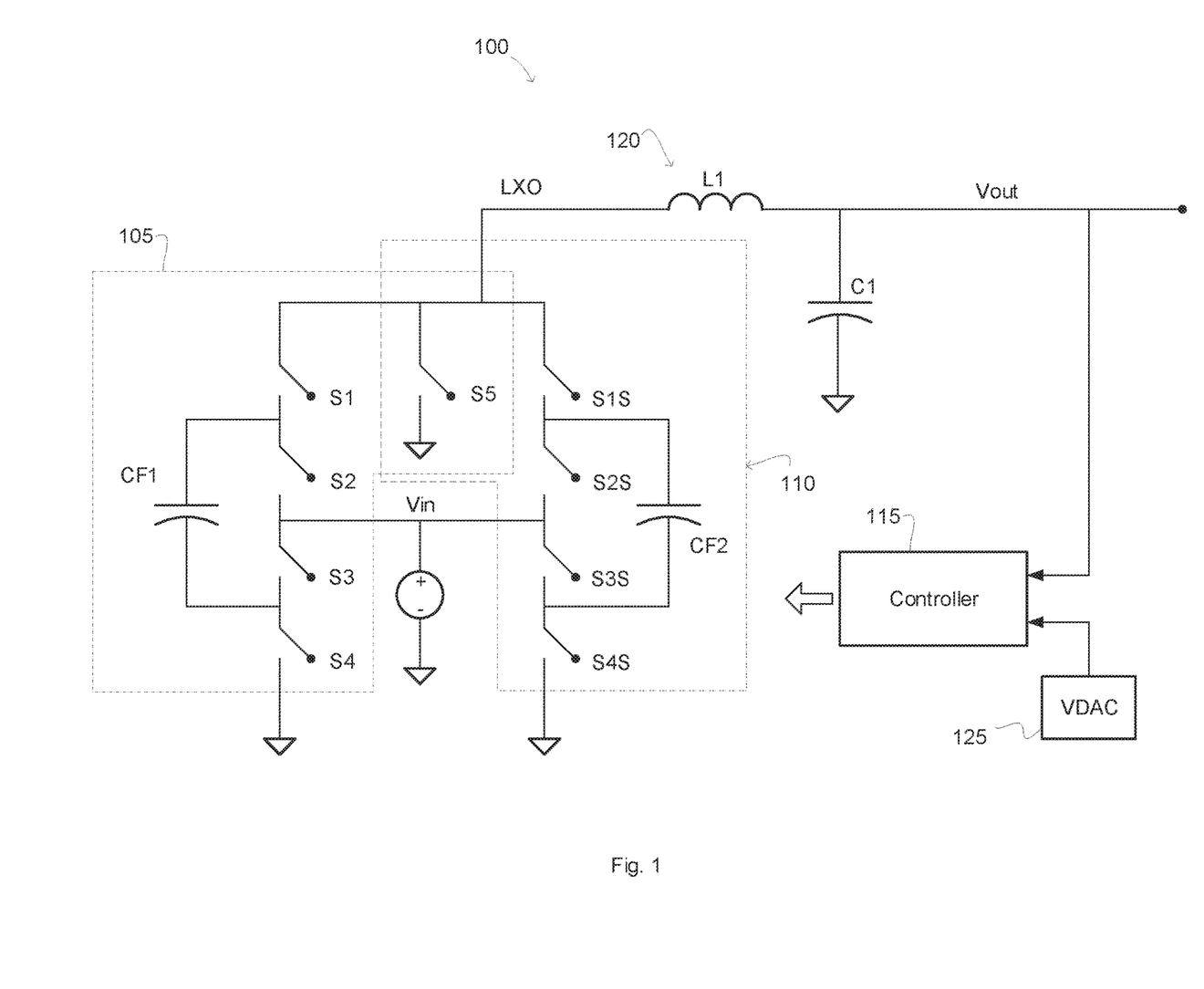
FIG. 1 illustrates an interleaved buck-boost converter in accordance with an aspect of the disclosure.

Some example three-level and four-level interleaved buck-boost converters will now be discussed in more detail. In a three-level embodiment, the master and slave switching stages are not cascaded whereas they may be cascaded through the linking switch in a four-level embodiment. An example three-level interleaved buck-boost converter 100 is shown in FIG. 1. A master switching stage 105 includes four serially-arranged switches beginning with a first switch S1 that couples to a second switch S2. Second switch S2 couples to a third switch S3 that in turn couples to ground through a fourth switch S1. First switch S1 couples to an input node LXO for an output filter formed by an inductor L1 and an output capacitor C1. The output capacitor smooths an output voltage Vout. A flying capacitor CF1 couples from a node between the first and second switches S1 and S2 to a node between the third and fourth switches S3 and S4. An input voltage source provides an input voltage Vin to a node between the second and third switches S2 and S3.

Slave switching stage 110 is analogous to master switching stage 105 in that slave switching stage 110 also includes four serially arranged switches S1S, S2S, S3S, and S4S. A second flying capacitor CF2 couples from a node between switches S1S and S2S to a node between switches S3S and S4S. The input voltage source also couples to a node between switches S2S and S3S. Both master switching stage 105 and slave switching stage 110 share a switch S5 during a buck mode of operation in which the output voltage is regulated to a level between ground and the input voltage. Switch S5 couples between ground and the LXO node.

During a magnetizing state for master switching stage 105, switches S2 and S4 are open whereas switches S1 and S3 are closed. The interleaved buck-boost converter comprises an input voltage terminal, output filter, master switching stage, slave switching stage, and a controller. The input voltage terminal is configured to provide an input voltage from a voltage source and the output filter includes an inductor having an input terminal and an output capacitor for an output voltage. The master switching stage includes a first flying capacitor and the slave switching stage includes a second flying capacitor. The controller configures the master switching stage in a master magnetizing switching state during a boost mode of operation in which the input terminal of the output filter is charged to a first multiple of the input voltage (for example, twice the input voltage). The master magnetizing switching state begins responsive to a first edge of a master clock signal (for example, the falling edge) and ends responsive to a first ramp signal exceeding an error signal. During the master magnetizing switching stage, the master's flying capacitor discharges into the input terminal of the output filter. The controller configures the slave switching stage to charge its flying capacitor during the master magnetizing switching state. The controller configures the master and slave switching stages to float their flying capacitors during a first sub-level cycle that extends from the end of the master magnetizing switching state until a second edge of the master clock signal (for example, the rising edge). During the first sub-level cycle, the slave switching stage charges the input terminal of the output filter to the input voltage. The length of the master magnetizing switching state may be deemed to define a duty cycle D. The length of the first sub-level cycle is thus (1−D). For the half-cycle (TB/2) of the master clock signal that extends between the first edge and the second edge, the voltage at the input terminal equals $D*2*Vin+(1-D)*Vin$.

The controller is further configured to configure the slave switching stage into a slave magnetizing switching state in which the slave switching stage charges the input terminal of the output filter to the first multiple of the input voltage. The slave magnetizing switching state begins responsive to the second edge of the master clock signal and ends when a second ramp signal exceeds the error signal. The flying capacitor for the slave switching stage discharges during the slave magnetizing switching state. The flying capacitor for the master switching stage is charged during the slave magnetizing switching state. The controller configures the master and slave switching stages to float their flying capacitors during a second sub-level cycle that extends from the end of the slave magnetizing switching state until the next first edge of the master clock signal (for example, the subsequent falling edge). During the second sub-level cycle, the master switching stage charges the input terminal of the output filter to the input voltage. For the half-cycle (TB/2) of the master clock signal that extends between the second edge and the subsequent first edge, the voltage at the input terminal also equals $D*2*Vin+(1-D)*Vin$.

Figure 2A:
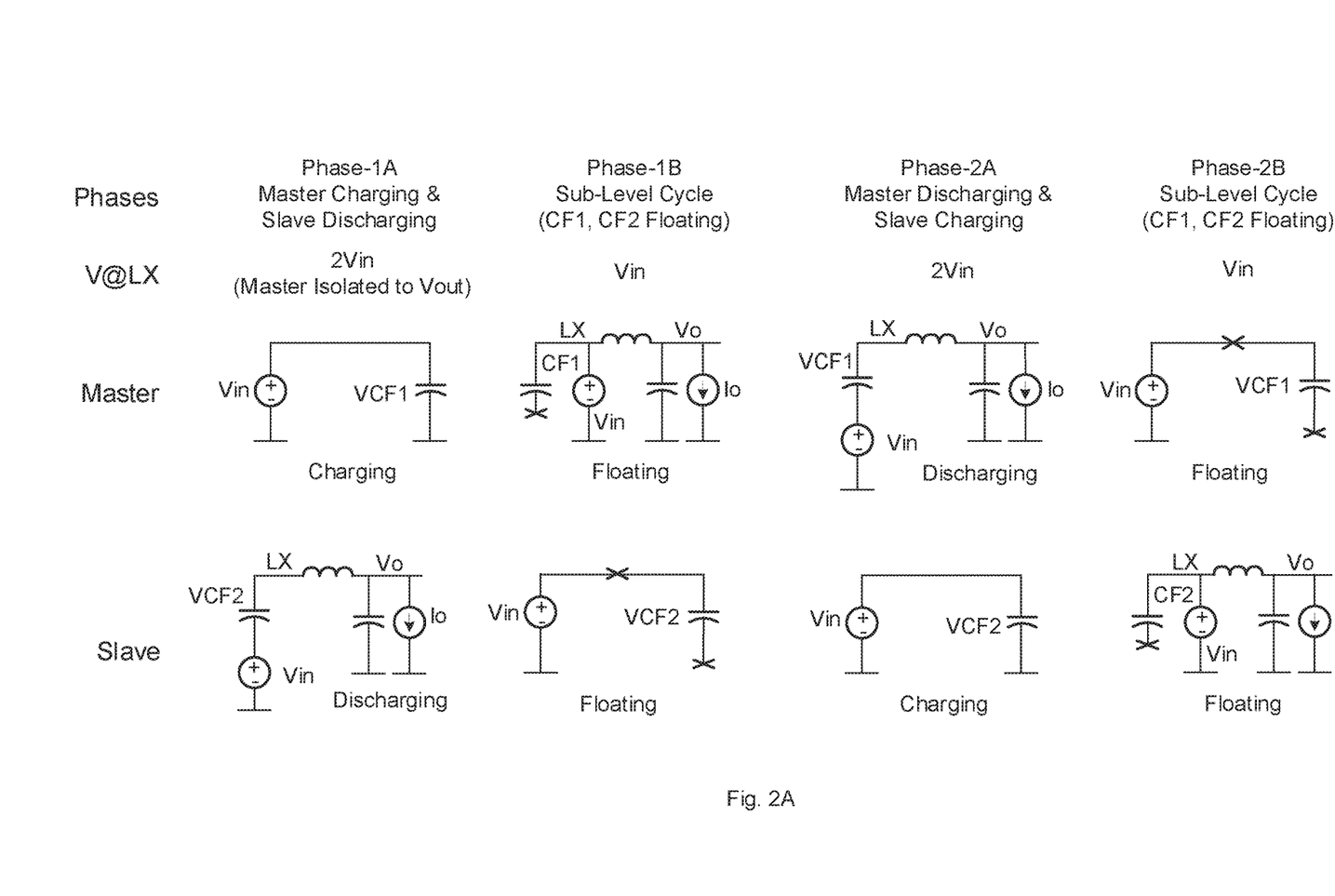
FIG. 2A illustrates the switch configurations for the master switching stage and the slave switching stage in the interleaved buck-boost converter of FIG. 1 during a boost mode of operation.

Since the operation of the master and slave switching stages is symmetrical during such an interleaved boost configuration, the slave and master switching stages can instead be referred to as a first switching stage and a second switching stage, respectively. Similarly, the slave magnetizing switching state may instead be denoted as a phase 1A whereas the second sub-level cycle may be denoted as a phase 1B as shown in FIG. 2A. In phase 1A, the input voltage and the slave flying capacitor voltage VCF2 are in series to charge the input terminal (LX) of the output filter to 2*Vin. The input voltage charges the master flying capacitor CF1 during phase 1A. During phase 1B, the slave flying capacitor CF2 floats. Similarly, the master flying capacitor CF1 floats during phase 1B but the input voltage for the master switching stage is charging the input terminal LX.

The master magnetizing switching stage may also be denoted as a phase 2A whereas the first sub-level cycle may be denoted as a phase 2B as also shown in FIG. 2A. In phase 2A, the input voltage and the master flying capacitor voltage VCF2 are in series to charge the input terminal LX of the output filter to 2*Vin. The input voltage charges the slave flying capacitor CF1 during phase 1A. During phase 1B, the master flying capacitor CF1 floats. Similarly, the slave flying capacitor CF2 floats during phase 1B but the input voltage for the slave switching stage is charging the input terminal LX.

Figure 2B:
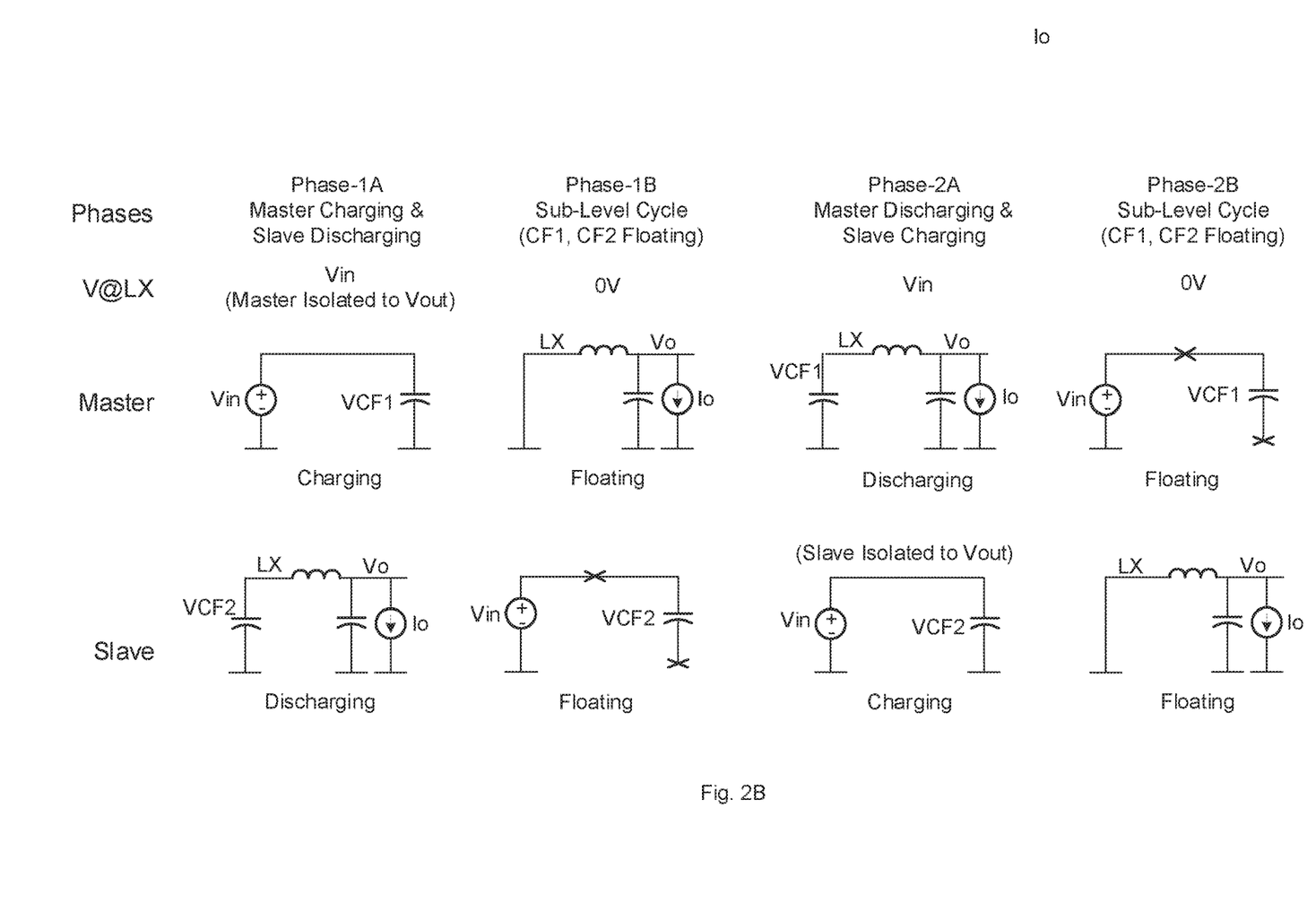
FIG. 2B illustrates the switch configurations for the master switching stage and the slave switching stage in the interleaved buck-boost converter of FIG. 1 during a buck mode of operation.

Interleaved buck-boost operation during a buck mode is analogous except that the voltage of the LX node cycles between Vin and 0 volts as shown in FIG. 2B. During the phase 1A switching state (the slave magnetizing switching state), the slave switching stage charges the LX node to Vin while the master switching stage charges its flying capacitor CF1. During the phase 1B switching state (the second sub-level cycle), both the master and the slave switching stages float their flying capacitors. The switch S5 (FIG. 1) is closed for the master switching stage so that LX node is grounded during the phase 1B switching state. During the phase 2A switching state (the master magnetizing switching state), the master switching stage charges the LX node to Vin while the slave switching state charges its flying capacitor CF2. During the phase 2B switching state (the first sub-level cycle), both the master and switching stages float their flying capacitors. The switch S5 is closed for the slave switching stage so that the LX node is grounded during the phase 2B switching state.

Figure 3:
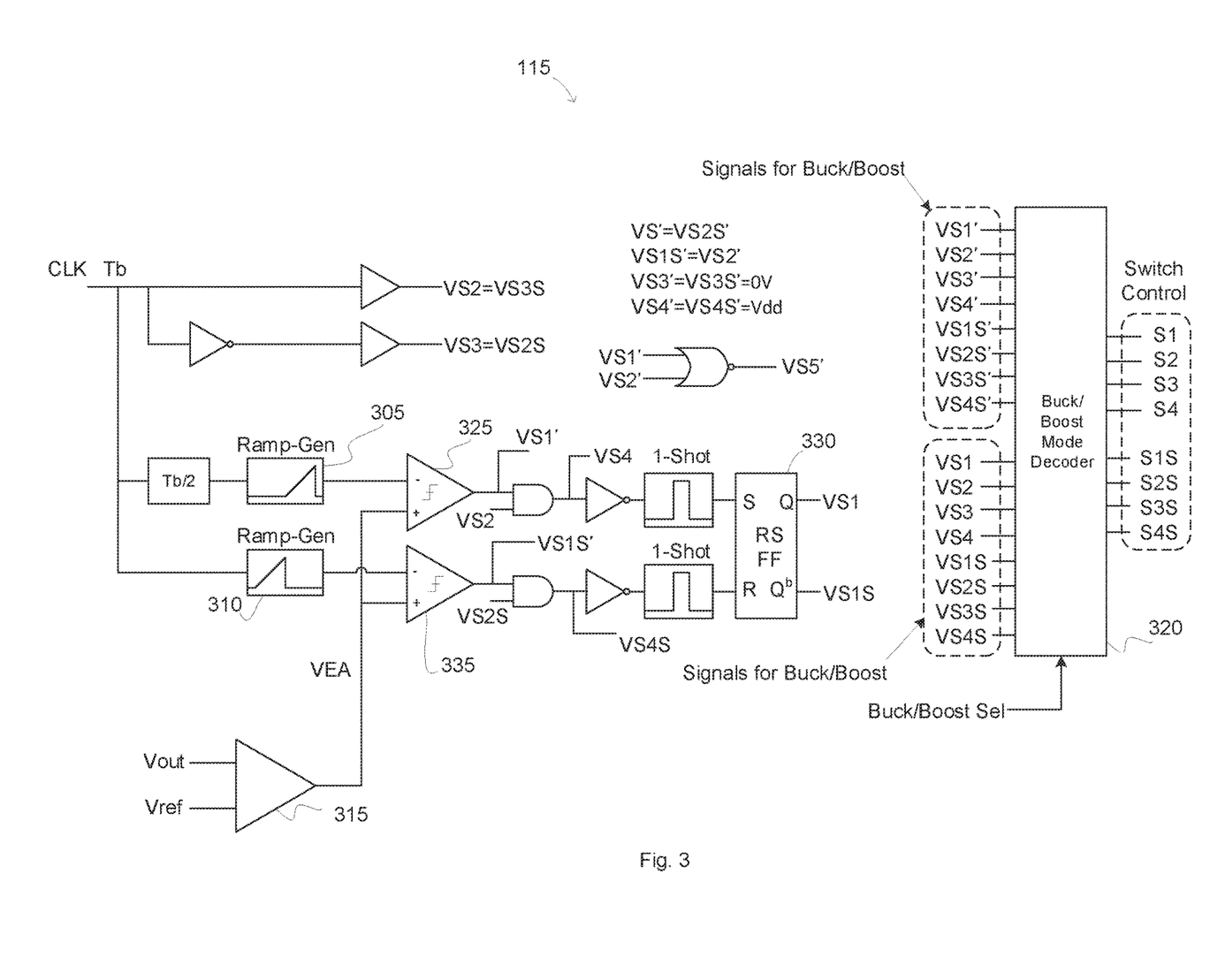
FIG. 3 is a circuit diagram of the PWM controller in the interleaved buck-boost converter of FIG. 1.

An example PWM controller 115 is shown in more detail in FIG. 3. PWM controller 115 includes a decoder 320 that controls the switching of switches S1, S2, S3, and S4 in the master switching stage and also the switching of the switches S1S, S2S, S3S, and S4S in the slave switching stage. Decoder 320 controls the switching responsive to a buck set of control signals VS1', VS2', VS3', VS3', VS4', VS1S', VS2S', VS3S', and VS4S' during the buck mode of operation. In particular, decoder 320 asserts each switch when the corresponding buck control signal is asserted. For example, if VS1' is asserted, decoder 320 switches on switch S1 in the master switching stage. Similarly, if VS1S' is asserted, decoder 320 switches on switch S1S in the slave switching stage, and so on for the remaining buck input signals. During the boost mode of operation, decoder 320 asserts the switches responsive to a boost set of control signals VS1, VS2, VS3, VS4, VS1S, VS2S, VS3S, and VS4S.

The master clock signal (CLK) is buffered to produce the boost control signals VS2 and VS3S and is inverted to produce the boost control signals VS3 and VS2S. An error amplifier 315 generates the error signal voltage (VEA) responsive to a difference between the output voltage and a reference voltage. A ramp generator 305 produces the first ramp signal responsive to a TB/2 delayed version of the master clock signal. A comparator 325 asserts the buck control signal VS1' when the error signal voltage exceeds the first ramp signal. Should both the buck control signal VS1' and the boost control signal VS2 be true, an AND gate asserts the boost control signal VS4. The boost control signal VS4 will thus be de-asserted whenever the boost control signal VS2 or the buck control signal VS1' are de-asserted (discharged to ground in a logic-high embodiment). The de-assertion of the boost control signal VS4 causes a one-shot circuit to set a set-reset flip-flop 330 to assert the boost control signal VS1.

The reset of flip-flop 330 asserts the boost control signal VS1S. To control this reset, a second ramp generator 310 generates the second ramp signal responsive to the master clock signal. A comparator 335 asserts the buck control signal VS1S' when the error signal voltage exceeds the second ramp signal. Should both the buck control signal VS1S' and the boost control signal VS2S be true, an AND gate asserts the boost control signal VS4S. The boost control signal VS4S will thus be de-asserted whenever either the buck control signal VS1S' or the boost control signal VS2S is de-asserted. The de-assertion of the boost control signal VS4S is inverted to trigger a one-shot circuit to reset flip-flop 330 to de-assert the boost control signal VS1 and assert the boost control signal VS1S.

Figure 4:
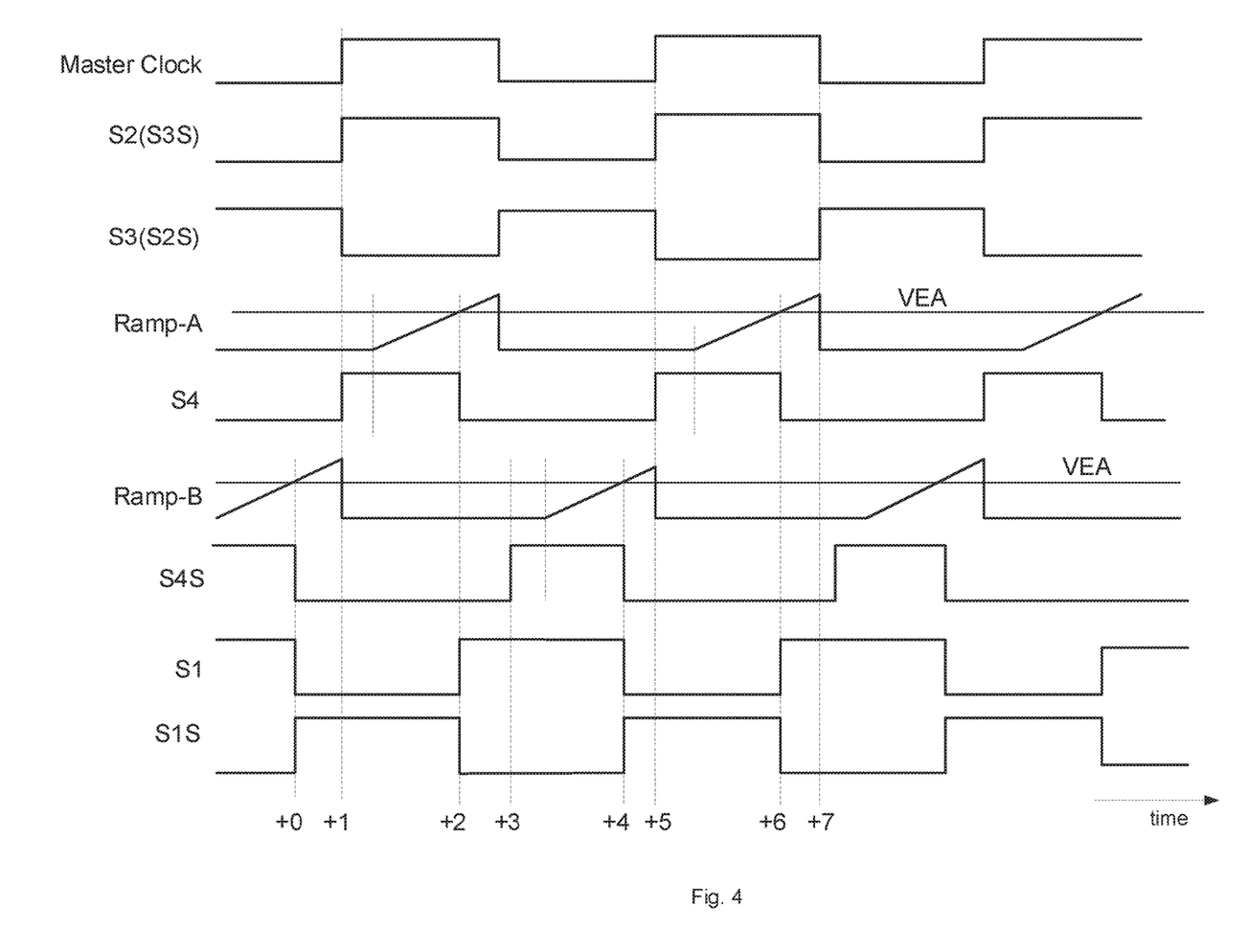
FIG. 4 is a timing diagram for the master clock signal, the dual ramp signals, the error signal voltage, and the switch states for the interleaved buck-boost converter of FIG. 1 during a boost mode of operation.

The resulting timing for the master clock signal, the boost control signals S2, S3S, S3, S2S, S4, S4S, S1, and S1S, the first ramp signal (Ramp-A), and the second ramp signal (Ramp-B) is shown in FIG. 4. At a time t0, the second ramp signal rises above the error signal voltage, which causes comparator 335 to de-assert the buck control signal VS1S' (not shown in FIG. 4). In turn, the de-assertion of the buck control signal VS1S' causes the boost control signal VS4S to be de-asserted, which triggers the reset of flip-flop 330 to cause boost control signal VS1S to be asserted and to cause boost control signal VS1 to be de-asserted. At a time t1, the master clock signal has a rising edge, which triggers boost control signals VS2 and VS3S to be asserted. The rising edge of the master clock also triggers second ramp generator to reset the second ramp signal (Ramp-B). At time t2, the first ramp signal (Ramp-A) rises above the error signal voltage to trigger comparator 325 to de-assert the buck control signal VS1'. The de-assertion of the buck control signal VS1' triggers the de-assertion of the boost control signal VS4 that in turn triggers the setting of flip-flop 330 to cause the assertion of the boost control signal VS1 and the de-assertion of the boost control signal VS1S.

At a time t3, the master clock has a falling edge, which causes boost control signals VS2 and VS3S to be de-asserted and causes boost control signals VS3 and VS2S to be asserted. In addition, the falling edge of the master clock causes a reset of the first ramp signal (Ramp-A). The assertion of the boost control signal VS2S triggers an assertion of boost control signal VS4S since the boost control signal VS4S is produced by an AND of the boost control signal VS2S and buck control signal VS1S'. At a time t4, the second ramp signal (Ramp-B) exceeds the error signal voltage so that comparator de-asserts the buck control signal VS1S'. The de-assertion of the buck control signal VS1S' in turn causes boost control signal VS4S to be de-asserted. The de-assertion of the boost control signal VS4S triggers a reset of flip-flop 330 so that boost control signal VS1 is de-asserted and boost control signal VS1S is asserted. Since the master magnetizing switching state occurs when switches S1 and S3 are on and switches S2 and S4 are off, the master magnetizing switching state begins at time t3 and ends at time t4.

The master clock signal has a rising edge at time t5, which triggers an assertion of boost control signals VS2 and VS3S and triggers a de-assertion of boost control signals S3 and S2S. The first sub-level cycle (Phase-2B) thus occurs from time t4 to time t5.

The assertion of the master clock at time t5 starts the slave magnetizing switching state since switches S1S and S3S will both be closed. At a time t6, the first ramp signal (Ramp-A) rises above the error signal voltage. Comparator 325 thus de-asserts the buck control signal VS1–, which triggers a de-assertion of the boost control signal VS4. The de-assertion of the boost control signal VS4 sets flip-flop 330, which causes an assertion of boost control signal VS1 and a de-assertion of boost control signal VS1S. The slave magnetizing switching state thus terminates at time t6. The master clock signal has another falling edge at a time t7. The second sub-level cycle thus extends from time t6 to time t7.

Referring again to FIG. 3, the buck control signal VS2S' is generated the same as the buck boost control signal VS1'. Similarly, buck control signal VS2' is generated the same as buck control signal VS1S'. A NOR gate NORs buck control signals VS1' and VS2' to generate the buck control signal VS5'. Finally, during the buck mode of operation, the buck control signals VS3' and VS3S' are both de-asserted to ground. Conversely, the buck control signals VS3' and VS4S' are both asserted to the power supply voltage VDD during the buck mode of operation.

Figure 5:
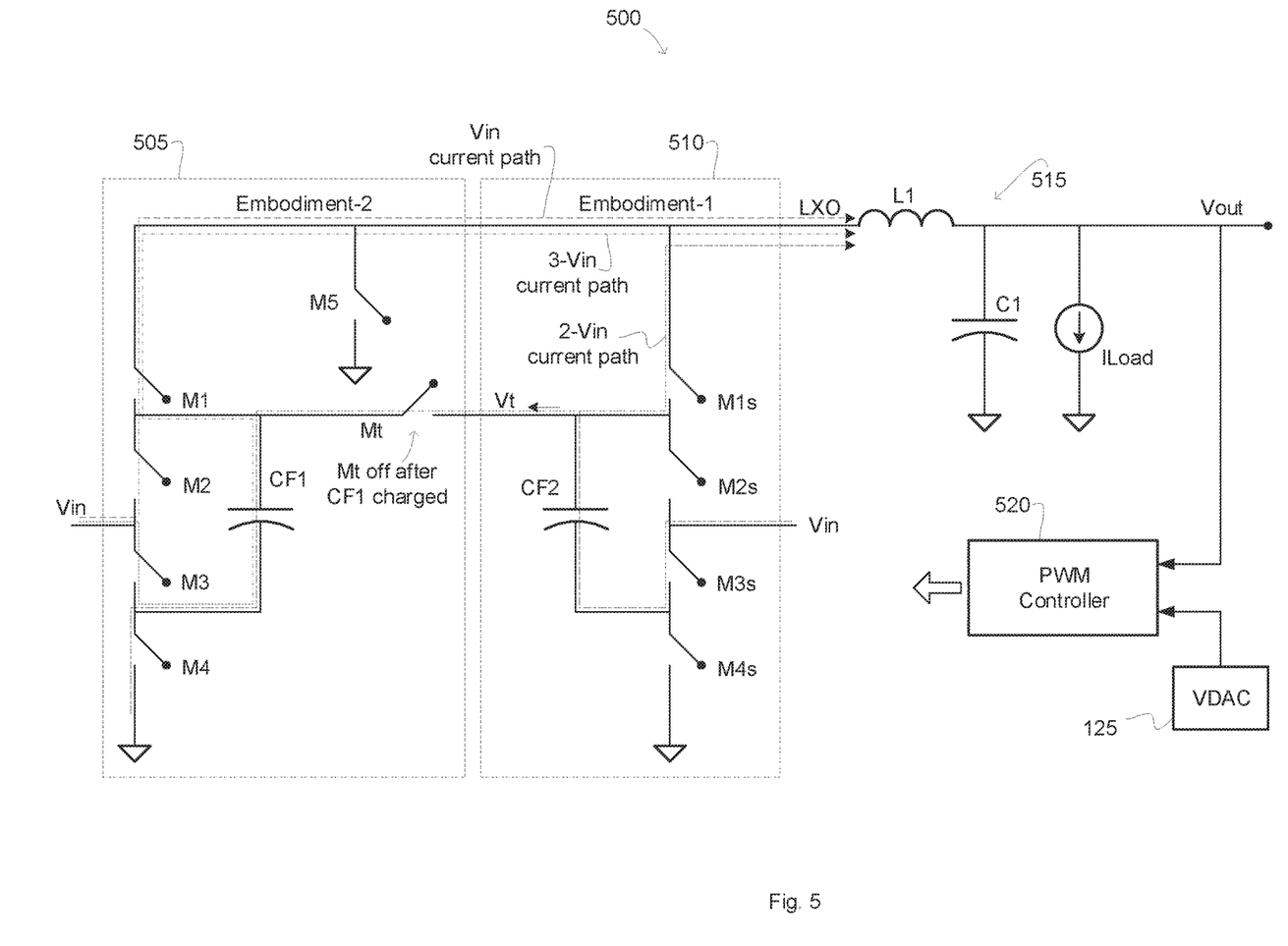
FIG. 5 illustrates a cascaded buck-boost converter in accordance with an aspect of the disclosure.

A four-level cascaded buck-boost converter 500 is shown in FIG. 5 that includes a master switching stage 505 and a slave switching stage 510. The input terminal LXO to an output filter 515 is alternatively charged to one of four different voltage levels, hence the four-level designation for cascaded buck-boost converter 500. Slave switching stage 510 is configured as discussed for slave switching stage 110. But master switching stage 505 includes an extra switch Mt (a cascade switch) that is closed during a cascade mode of operation in which flying capacitor CF1 for master switching stage 505 is charged. A PWM controller 520 controls the switching for cascaded buck-boost converter 500 as shown in the following Table 1:

TABLE 1

| | Range-3 (Boost) 2 Vin < Vout < 3 Vin | | Range-2 (Boost) Vin < Vout < 2 Vin | | Range-1 (Buck) 0 V < Vout < Vin | |
| | | | Phases | | | |
| LXO | Φ1 3 Vin | Φ2 2 Vin | Φ1 2 Vin | Φ2 Vin | Φ1 Vin | Φ2 0 V |
|---|---|---|---|---|---|---|
| M1 | 1 | 0 | 0 | 1 | 1 | 0 |
| M2 | 0 | 0 | 0 | 1 | 1 | 1 |
| M3 | 1 | 0 | 0 | 0 | 0 | 0 |
| M4 | 0 | 1 | 1 | 0 | 0 | 0 |
| Mt | 0 | 1 | 1 | 0 | 0 | 0 |
| M1S | 0 | 1 | 1 | 0 | 0 | 0 |
| M2S | 1 | 0 | 0 | 1 | 1 | 1 |
| M3S | 0 | 1 | 1 | 0 | 0 | 0 |
| M4S | 1 | 0 | 0 | 1 | 1 | 0 |
| M5 | 0 | 1 | 1 | 0 | 0 | 1 |

As can be seen from Table 1, the voltage of the LXO node alternates between ground and Vin during a buck mode of operation (Range-1). During a first cascaded boost mode of operation (Range-2), the voltage of the LXO node alternates between 2*Vin and Vin. In a second cascaded boost mode of operation, the voltage of the LXO node alternates between 3*Vin and 2*Vin. The four different voltages for the LXO node are thus 0 V, Vin, 2*Vin, and 3*Vin.

The corresponding current paths (a ground current path, a Vin current path, a 2*Vin current path, and a 3*Vin current path) are highlighted in buck-boost converter 500. In particular, the MT switch is closed while slave switching stage 510 is in its magnetizing switching state in which the LXO node is charged to 2*Vin. The flying capacitor CF1 is thus also charged to 2*Vin while the flying capacitor CF2 in slave switching stage 510 discharges. During a subsequent magnetizing state for master switching stage 505, the LXO node voltage can thus be charged to 3*Vin because the input voltage Vin is stacked serially within master switching stage 505 with its flying capacitor CF1 that was charged to 2*Vin.

It will be appreciated that the cascaded buck-boost converter principles may be generalized so that the LXO node voltage may be alternated between K*Vin and (K−1)*Vin, where K is a positive integer greater than two. The reference voltage used by the error amplifier to generate the error signal voltage is then scaled appropriately depending upon K. As shown in FIG. 5, a voltage digital to analog converter (VDAC) may be used to generate the appropriate reference voltage.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed:

1. An interleaved buck-boost converter, comprising:
   an input voltage source;
   an output filter including an inductor having an input terminal and an output capacitor for an output voltage;
   an error amplifier configured to drive an error signal responsive to a difference between the output voltage and a reference voltage;
   a master switching stage including a first flying capacitor;
   a slave switching stage including a second flying capacitor;
   a pulse width modulation (PWM) controller configured to configure the master switching stage into a master magnetizing switching state in which the first flying capacitor is coupled between the input voltage source and the input terminal to charge the input terminal to a first multiple of the input voltage during a master magnetizing period extending from a reset of a first ramp signal until a second ramp signal exceeds the error signal;
   a first ramp generator configured to generate the first ramp signal, wherein the first ramp generator is further configured to reset the first ramp signal responsive to a falling edge of a clock signal; and
   a second ramp generator configured to generate the second ramp signal, wherein the second ramp generator is further configured to reset the second ramp signal responsive to a rising edge of the clock signal;
   wherein the PWM controller is further configured to configure the slave switching stage into a slave magnetizing switching state in which the second flying capacitor is coupled between the input voltage source and the input voltage terminal to charge the input terminal to the first multiple of the input voltage during a slave magnetizing period extending from a reset of the second ramp signal until the first ramp signal exceeds the error signal.

2. The interleaved buck-boost converter of claim 1, wherein the first multiple of the input voltage is twice the input voltage.

3. The interleaved buck-boost converter of claim 1, wherein the PWM controller is further configured so that the master magnetizing period occurs during a first half of a clock signal period and so that the slave magnetizing period occurs during a second half of the clock signal period.

4. The interleaved buck-boost converter of claim 3, wherein the first multiple of the input voltage is one times the input voltage.

5. The interleaved buck-boost converter of claim 1, further comprising:
a digital-to-analog converter configured to generate the reference voltage.

6. The interleaved buck-boost converter of claim 1, wherein the master switching stage comprises four switches arranged in series, and wherein the slave switching stage comprises four switches arranged in series.

7. A method of operating an interleaved buck-boost converter, comprising:
generating an error signal responsive to a difference between an output voltage for an output filter and a reference voltage;
generating a first ramp signal responsive to a first edge of a clock signal;
generating a second ramp signal responsive to a second edge of the clock signal;
in a master switching stage including a first flying capacitor, charging an input terminal for the output filter to twice an input voltage over a master magnetizing period that begins responsive to the first edge of a clock signal and ends responsive to the second ramp signal exceeding the error signal; and
in a slave switching stage including a second flying capacitor, charging the input terminal to the input voltage during a first sub-level cycle extending from a termination of the master magnetizing period to a subsequent first edge of the clock signal.

8. The method of claim 7, further comprising:
in the slave switching stage, charging the input terminal to twice the input voltage during the slave magnetizing period that begins from the subsequent first edge of the clock signal and ends responsive to the first ramp signal exceeding the error signal; and
in the master switching stage, charging the input terminal to the input voltage during a second sub-level cycle extending from a termination of the slave magnetizing period to a subsequent second edge of the clock signal.

9. The method of claim 8, wherein the master switching stage includes four serially-arranged switches beginning with a master first switch coupled to the input terminal, and wherein charging the input terminal to twice the input voltage during the master magnetizing period includes closing the master first switch.

10. The method of claim 9, wherein the closing of the master first switch is responsive to a set of a set-reset flip-flop.

11. The method of claim 10, wherein the slave switching stage includes four serially-arranged switches beginning with a slave first switch coupled to the input terminal, and wherein charging the input terminal to twice the input voltage during the slave magnetizing period includes closing the slave first switch.

12. The method of claim 11, wherein the closing of the slave first switch is responsive to a reset of the set-reset flip-flop.

13. An interleaved cascaded buck-boost converter, comprising:
an input voltage terminal configured to provide an input voltage;
an output filter including an inductor having an input terminal and an output capacitor for an output voltage;
an error amplifier configured to drive an error signal responsive to a difference between the output voltage and a reference voltage;
a master switching stage having four master switches and a first flying capacitor;
a slave switching stage having four slave switches and a second flying capacitor;
a cascade switch coupled between the master switching stage and the slave switching stage; and
a pulse width modulation (PWM) controller configured to configure the master switching stage into a master magnetizing switching state in which the input terminal is charged to three times an input voltage during a master magnetizing period extending from a reset of a first ramp signal until a second ramp signal exceeds the error signal, and
wherein the PWM controller is further configured to configure the slave switching stage into a slave de-magnetizing switching state in which the input terminal is charged to two times the input voltage during a slave magnetizing period extending from a reset of the second ramp signal until the first ramp signal exceeds the error signal, and wherein the PWM controller is further configured to close the cascade switch during the slave magnetizing period to charge the first flying capacitor to twice the input voltage.

14. The interleaved cascaded buck-boost converter of claim 13, further comprising:
a first ramp generator configured to generate the first ramp signal, wherein the first ramp generator is further configured to reset the first ramp signal responsive to a first edge of a clock signal; and
a second ramp generator configured to generate the second ramp signal, wherein the second ramp generator is further configured to reset the second ramp signal responsive to a second edge of the clock signal.

15. The interleaved cascaded buck-boost converter of claim 14, wherein the first ramp generator is further configured so that the first edge of the clock signal is a falling edge, and wherein the second ramp generator is further configured so that the second edge of the clock signal is a rising edge.

* * * * *